W. C. HADLEY.
AMUSEMENT DEVICE.
APPLICATION FILED AUG. 20, 1920.
1,403,947.
Patented Jan. 17, 1922.
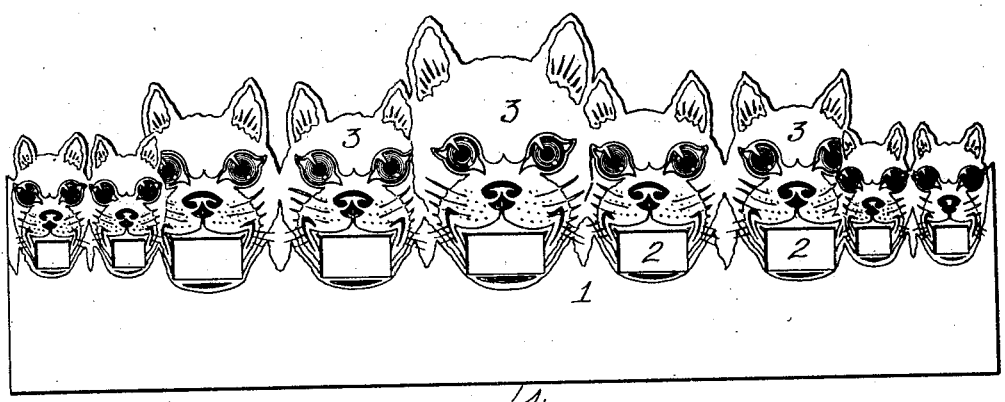
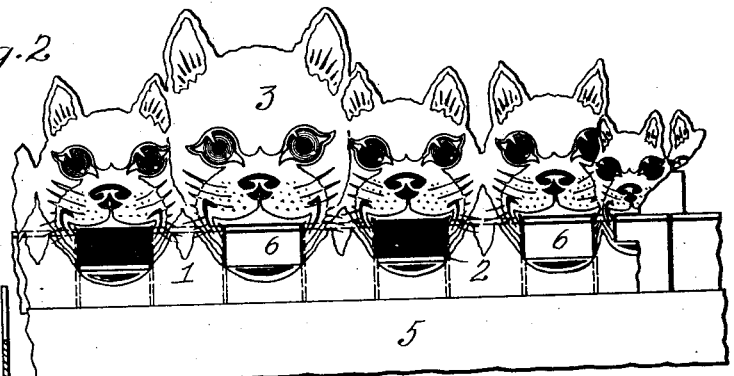
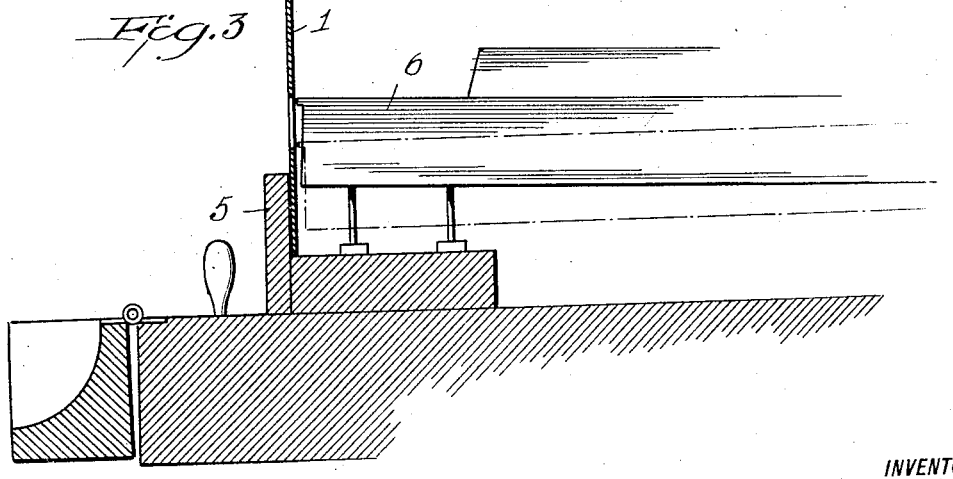
INVENTOR
WALTER C. HADLEY
ATTORNEYS
WITNESSES

UNITED STATES PATENT OFFICE.

WALTER C. HADLEY, OF NEW YORK, N. Y., ASSIGNOR TO CENTRAL TALKING MACHINE SHOP, INC., OF NEW YORK, N. Y., A CORPORATION OF NEW YORK.

AMUSEMENT DEVICE.

1,403,947.        Specification of Letters Patent.        Patented Jan. 17, 1922.

Application filed August 20, 1920. Serial No. 404,965.

*To all whom it may concern:*

Be it known that I, WALTER C. HADLEY, a citizen of the United States of America, and resident of Nos. 20–21 Morningside Avenue, in the city of New York, borough of Manhattan, county of New York, and State of New York, have invented a new and useful Improvement in an Amusement Device, of which the following is a specification.

The present invention relates to an amusement device for use in connection with automatic or self-playing pianos.

The object of the present invention is to provide a panel showing a head with a mouth opening therein through which the forward end of the piano key is visible and as the key moves up and down, giving the impression that the head is opening and closing its mouth.

Preferably the device will be embodied in a structure comprising a plurality of heads located in a line with each other and arranged to co-operate with a plurality of the white keys of a piano.

The invention is illustrated in the accompanying drawings in which—

Figure 1 shows a front elevation of one embodiment thereof.

Figure 2 shows a fragmentary portion of the device shown in Figure 1, in operative position in front of the white keys of a piano, with parts broken away to illustrate the co-operation of the piano keys therewith.

Figure 3 shows a vertical sectional view of a portion of a piano illustrating the amusement device in operative position.

As shown in Figures 1 and 2 the device comprises a body portion 1 provided with an opening 2 and having a representation of a head 3 so positioned with relation to the opening 2 that the opening 2 forms the mouth of the head. This head may be a human head or an animal head, as desired, that shown in the drawing being supposed to represent the head of a cat.

Preferably the device will be of indefinite length showing a plurality of heads of varying sizes as shown in Figures 1 and 2, and each head will be provided with an opening 2 forming the mouth opening. Also the heads may be of different size, as indicated, and the upper edge will preferably be in silhouette outlining the tops of the heads.

The opening 2 is positioned with relation to the base line 4, so that when the device is inserted back of the board 5 of a piano, and in front of the forward ends of the white keys 6, the upper surface of the forward end of the key, when the same is elevated, will correspond to the upper edge of the opening 2, and if there are a plurality of openings their upper edges will be on the same horizontal line as shown even though the openings vary in size.

When in position, as shown in Figures 2 and 3, the forward ends of the keys 6 are visible through the openings. As the piano is operated the keys move up and down and the downward movement gives the impression that the head is opening its mouth, the upward movement corresponding to the closing movement of the mouth.

It is of course understood that the openings must be spaced apart from each other so that they will co-operate with independent keys and they must not be larger than the forward end of the key.

In operation, assuming that the device is formed as shown in Figure 1, it is inserted back of the board 5 and in front of the white keys 6 so that a single key will be opposite each opening. When the piano is operated the movement of the keys will be visible through the openings.

It is of course understood that the invention is not limited to a device having more than one head and one opening, nor to any particular form of head.

Having described my invention, I claim:—

1. An amusement device, comprising a panel arranged to be supported in front of and to cover the ends of the white keys of a piano, a representation of a head on the front face of the panel and an opening in the panel positioned to represent the mouth of the head through which the end of one white key may be visible.

2. An amusement device, comprising a panel arranged to be supported in front of and to cover the ends of the white keys of a piano, a plurality of heads represented on one face of the panel, a plurality of openings therein representing the mouths of the heads, the upper line of the openings being in the same horizontal plane and the openings spaced so as to expose the ends of the white keys when the panel is positioned in front thereof.

WALTER C. HADLEY.